United States Patent [19]
Kwon

[11] Patent Number: 5,720,000
[45] Date of Patent: Feb. 17, 1998

[54] FUZZY LOGIC APPARATUS

[75] Inventor: Soon-Don Kwon, Seoul, Rep. of Korea

[73] Assignee: Samsung Electronics Co., Ltd., Kyungki-do, Rep. of Korea

[21] Appl. No.: 629,870

[22] Filed: Apr. 10, 1996

[30] Foreign Application Priority Data

Jun. 17, 1995 [KR] Rep. of Korea ............... 16188/1995

[51] Int. Cl.⁶ ............................................. G06F 9/44
[52] U.S. Cl. ................................... 395/3; 395/900
[58] Field of Search ................................ 395/3, 900

[56] References Cited

U.S. PATENT DOCUMENTS

| | | | |
|---|---|---|---|
| 5,179,629 | 1/1993 | Nakamura | 395/3 |
| 5,280,624 | 1/1994 | Ikeda | 395/3 |
| 5,371,832 | 12/1994 | Eichfeld et al. | 395/3 |
| 5,412,752 | 5/1995 | Basehore et al. | 395/3 |

*Primary Examiner*—George B. Davis
*Attorney, Agent, or Firm*—Sughrue, Mion, Zinn, Macpeak & Seas, PLLC

[57] ABSTRACT

A fuzzy logic apparatus includes: an adder, having two input ports, for receiving through one input port a difference value of a difference between a predetermined crisp input data and center data and receiving through the other input port a predetermined first selection signal for determining a corresponding membership function, and adding the data input thereto; a memory having pre-stored attachment degree data for receiving the data output from the adder as address data and outputting attachment degree data bits corresponding to the input address; a selector for receiving the attachment degree data divided into groups and outputting one of the groups of attachment degree data based on predetermined second and third selection signals for selecting the membership function; and an AND logic unit for receiving through one input port a logic value corresponding to comparison between a predetermined value and difference data corresponding to a difference between the predetermined crisp input data and the center data and receiving through the other input port the group of attachment data output from the selector and outputting final attachment degree data by logically ANDing the data input to the two input ports. Accordingly, the memory capacity of the fuzzy logic apparatus is reduced by setting an arbitrary membership function at an arbitrary position, according the height of an equilateral triangle of the membership function.

16 Claims, 3 Drawing Sheets

FUZZY LOGIC APPARATUS

BACKGROUND OF THE INVENTION

1. Field of the Invention

The present invention relates to a fuzzy logic apparatus, and more particularly to a fuzzy logic apparatus in which memory mapping is efficiently used for determining a degree of attachment of an input to a fuzzy value.

The present application for a fuzzy logic apparatus is based on Korean Application No. 16188/1995 which is incorporated herein by reference for all purposes.

2. Description of the Related Art

Generally, a fuzzy logic apparatus outputs an appropriate value, which is defined by a user, by performing a reasoning operation on an input value for an arbitrary situation. For example, when such a fuzzy logic apparatus is employed in a vacuum cleaner, the suction pressure of the vacuum cleaner is used as the input data. The fuzzy logic apparatus determines the rotational speed of a motor by performing a reasoning operation on the input according to a definitional reference function, known as a membership function (MF) defined by a user.

FIG. 1 is a block diagram illustrating a conventional fuzzy logic apparatus. This fuzzy logic apparatus constitutes eight MFs each having a resolution of 8-bits. Referring to FIG. 1, first crisp input data having a resolution of 8-bits and 3-bit MF selection data for selecting one of the eight MFs are input to a memory 100 as an 11-bit address. Memory 100 outputs 5 bits of data for each address selected. Accordingly, the required amount of memory capacity for memory 100 is 2048 locations×5 bits/location=10,240 bits.

FIG. 2 shows a memory map of the MFs stored in memory 100. As shown in FIG. 2, each MF, which has a resolution of 8-bits, is assigned to an address within a 256 byte range. Of course, each MF can be arbitrarily positioned within the 256 byte range, that is, between 0 to 256d. Accordingly, it can be seen by referring to FIG. 2 that the eight MFs can be positioned between addresses "0" and "2047d." As in a method of controlling a skilled person's work process (a common feature of control and regularity) by producing the same as fuzzy data, a regular rule in a typical controller, such as a PID of a conventional fuzzy logic apparatus, is employed in the conventional fuzzy logic apparatus shown in FIG. 1.

An input of 8 bits of data is preferably divided into about seven MFs during usual digital processing. However, a problem with the conventional fuzzy logic apparatus is that 256 bytes are required for each MF and a memory of as many as 2K bytes are required for the eight MFs.

SUMMARY OF THE INVENTION

To solve the above problem, it is an object of the present invention to provide a fuzzy logic apparatus which can minimize memory use by setting an arbitrary membership function at an arbitrary position by using as a reference the height of an equilateral triangle of the membership function.

Accordingly, to achieve the above object, there is provided a fuzzy logic apparatus comprising: adding means having first and second input ports, for receiving through the first input port data representing a difference between a predetermined crisp input data and center data of a membership function and receiving through the second input port a predetermined first selection signal for determining the membership function, and outputting address data by adding the data received at the first and second input ports; memory means having pre-stored attachment degree data relating to the membership function for receiving the address data output from the adding means and outputting attachment degree data corresponding to the received address data; selecting means for receiving the attachment degree data and selectively outputting a portion of the attachment degree data based on predetermined second and third selection signals, wherein the second and third selection signals correspond to the membership function; and logic means having two input ports, for receiving through one of the input ports a logic value corresponding to a comparison between a predetermined value and a difference between the predetermined crisp input data and the center data and receiving through the other of the input ports the data output from the selecting means, and outputting a final attachment degree data by logically combining the data input to the two input ports.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
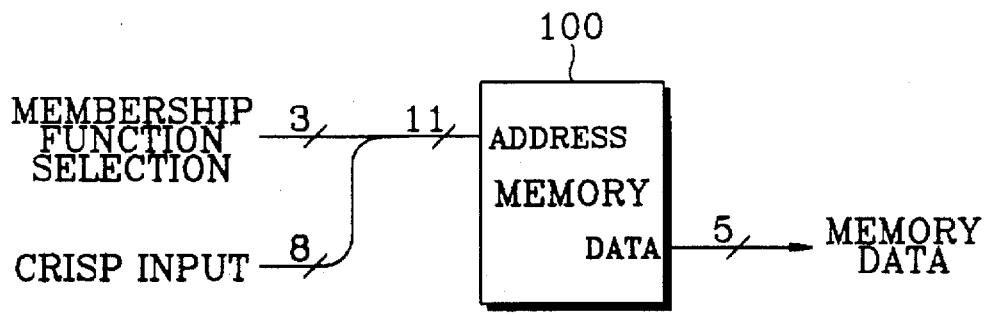
FIG. 1 is a block diagram illustrating a conventional fuzzy logic apparatus.
Figure 2:
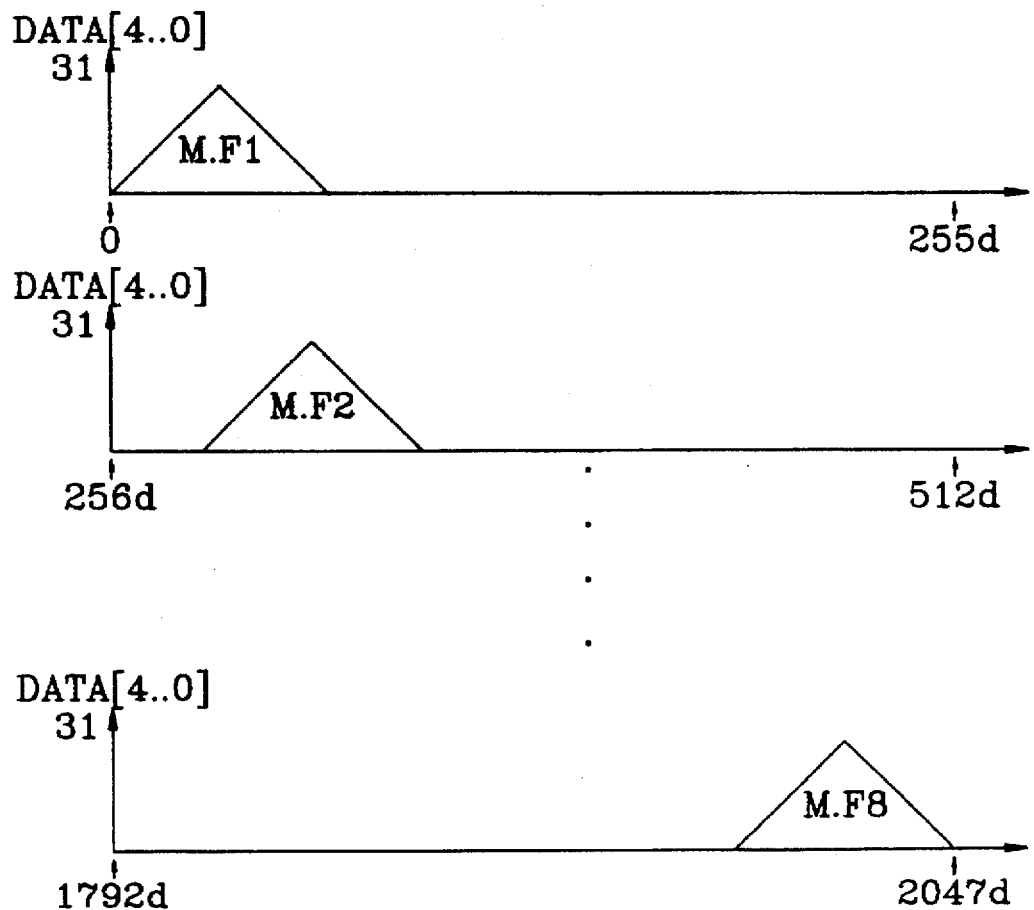
FIG. 2 is a view showing a memory map of membership functions of the conventional fuzzy logic apparatus of FIG. 1.
Figure 3:
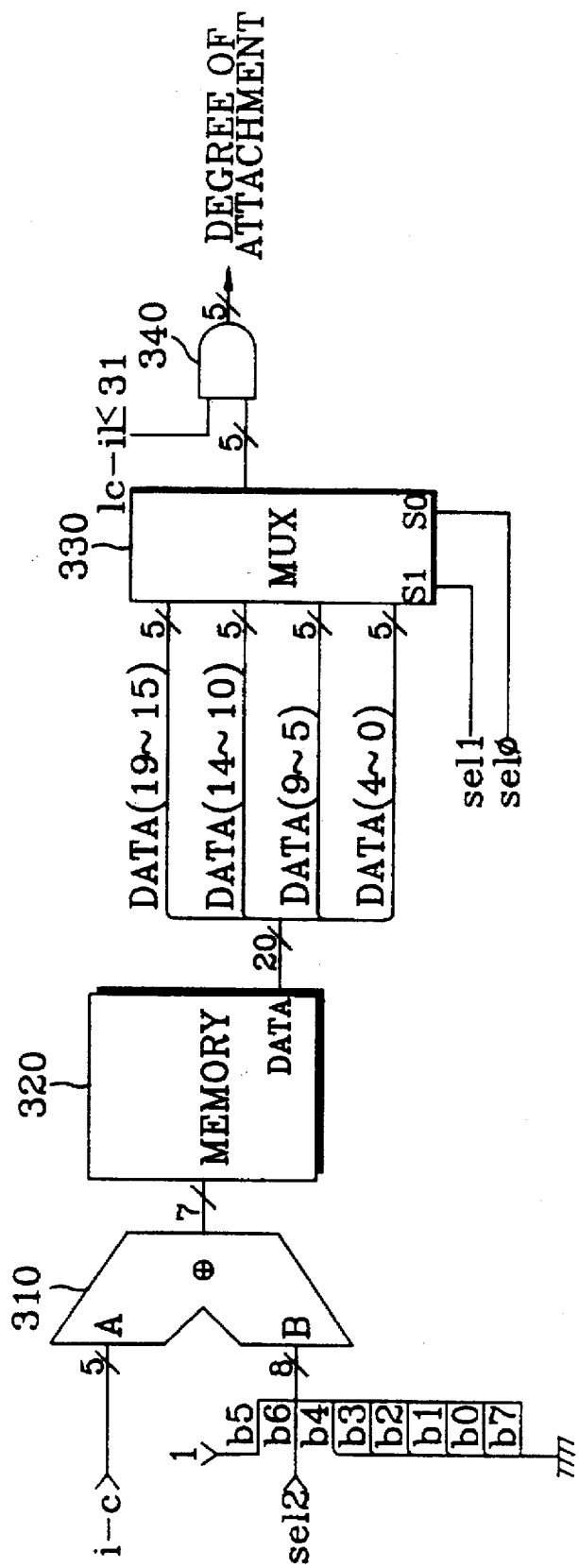
FIG. 3 is a block diagram illustrating a fuzzy logic apparatus according to a preferred embodiment of the present invention.

An embodiment of the present invention is shown in FIG. 3 which is a block diagram of a fuzzy logic apparatus. In the fuzzy logic apparatus of FIG. 3, an adder 310 having input ports "A" and "B", adds data input to these ports and outputs the added data, except for the MSB (most significant bit). A memory 320 having data stored at predetermined addresses, receives through an input address port the data output from adder 310 and outputs the corresponding 20-bit data stored at the address in the memory corresponding to the input data. A multiplexer 330 receives through four input ports the 20-bit data output from memory 320, in which each of the four input ports receives a group of 5 bits of the 20 bits of data output from memory 320. Multiplexer 330 selectively outputs one of the groups of 5-bits of data input to one of the four input ports, based on predetermined first and second selection signals "sel 0" and "sel 1". An AND logic unit 340, which has two input ports, receives through one of the input ports the data output from multiplexer 330. The other input port of AND logic unit 340 receives a signal corresponding to the absolute value of the difference between an input value "i" and a center value "c". AND logic unit 340 performs an AND logic function on the data input to it, and outputs data corresponding to a degree of attachment of the input value and a fuzzy value defined by a membership function.

Figures 4A, 4B:
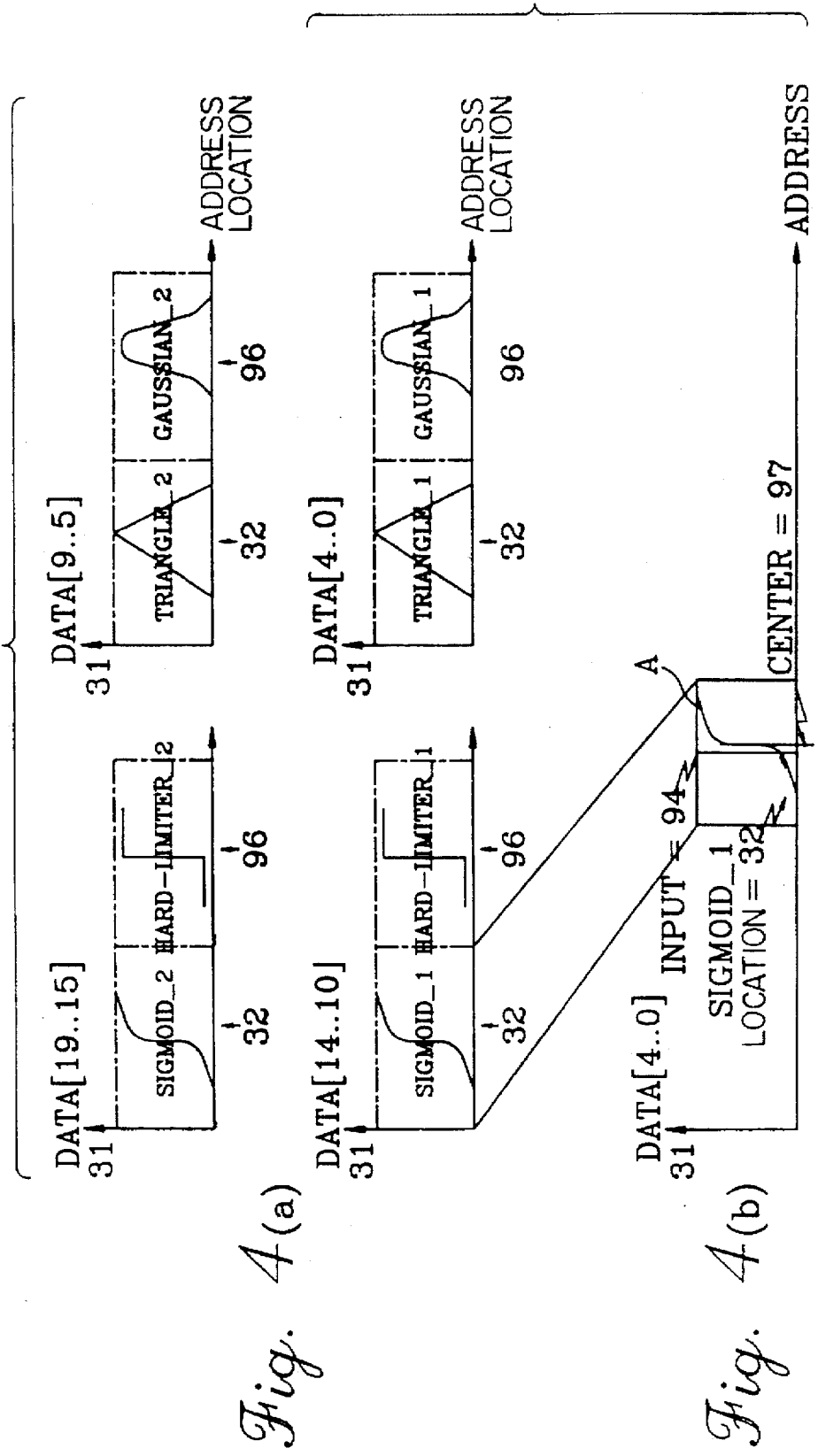
FIG. 4 is a schematic view showing a state of determining a degree of attachment of an input value to a fuzzy value, according to the embodiment of the invention shown in FIG. 3.

FIG. 4 shows how an attachment degree is obtained according to an embodiment of the invention shown in FIG.

3, in which the attachment degree corresponds to the degree of fuzziness defined by a membership function in a fuzzy rule. In FIG. 4, the center of an MF "A" is a value for indicating a position of sigmoid_1. When the center of the membership function is indicated by the variable "c" and a crisp input is indicated by the variable "i," the absolute value of "i-c" is input to input port "A" of adder 310, which indicates how much the center value is apart from the input value defined by the rule and the set center value (value assigned to each rule). A third selection value "sel 2" is input as bit 6 of an eight bit value input to input port "B" of adder 310, in which bit 5 has a value of "1" and bits 0–4 and bit 7 each has a value of "0".

Referring to FIGS. 3 and 4, the values 32d and 96d are input to input port "B" of adder 310, according to the value of "sel 2" to form medium values in MF tables. For example, when sel 2=0, 32d is input to port "B", and when sel 2=1, 96d is input to port "B". The sum output from adder 310 is input to the input address port of memory 320 which outputs an attachment degree value. Next, the 20-bit data output from memory 320 is input, in groups of 5 bits each, to multiplexer 330, and one of the groups of 5-bits of data selected according to the first and second selection signals "sel 0" and "sel 1", is output. That is, via adder 310, memory 320, and multiplexer 330, eight MFs, as defined in table 1 below, are arbitrarily selected according to the first through third selection signals and attachment data corresponding to the selected MF is output.

TABLE 1

| sel 2 | sel 1 | sel 0 | MEMBERSHIP FUNCTION |
|---|---|---|---|
| 0 | 0 | 0 | Triangle_1 |
| 0 | 0 | 1 | Triangle_2 |
| 0 | 1 | 0 | Sigmoid_1 |
| 0 | 1 | 1 | Sigmoid_2 |
| 0 | 1 | 1 | Gaussian_1 |
| 1 | 0 | 1 | Gaussian_2 |
| 1 | 1 | 0 | Hard-Limiter_1 |
| 1 | 1 | 1 | Hard-Limiter_2 |

Referring to FIG. 4, when an input rule is Sigmoid_1, as an example, a memory table for Sigmoid_1 is data-mapped with a center value "c" defined by the rule. First, when $|c-i| \leq 31$, attachment degree data is output through AND logic unit 340, however, if the condition $|c-i| \leq 31$ is not satisfied, attachment degree data of "0" is output. Here, the value "31" is the height of the MF and the width of the MF is 62 to 64, which would be the length of a side of a corresponding equilateral triangle. Adder 310 determines a position for the MF, in which the position of the MF is obtained by adding the data input to ports "A" and "B." For example, when the value "32d" is input to input port "B" and the crisp input "I" and center "C" are 94 and 97, respectively, adder 310 operates to determine a positional value for the MF and outputs a value of "29". Accordingly, memory 320 is addressed with an address of 29, and memory 320 outputs the corresponding attachment degree data for that address. Multiplexer 320 receives the 20-bit attachment degree data in groups of 5 bits each, and outputs one of the groups of 5-bit input data which is selected according to first and second selection signals "sel 0" and "sel 1," which corresponds to the selected MF. AND logic unit 340 then outputs the output data of multiplexer 330 as a final attachment degree data.

As described above, in the present invention, it can be seen that the minimum required amount of memory is the memory capacity for storing 128×20=2560 bits. In the embodiment of the present invention, the largest attachment degree is about 31 when 7 or 8 MFs are used with respect to the input having 8-bit resolution (with a standard of an equilateral triangle). That is, the present invention intends to set an arbitrary MF at an arbitrary position, with a standard of the height of the equilateral triangle, and performs a selective memory mapping and logic operation in order to minimize the use of memory. Further, the fuzzy logic apparatus according to the present invention has the effect of reducing the memory capacity by setting an arbitrary MF at an arbitrary position, with a standard of the height of the equilateral triangle.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A fuzzy logic apparatus comprising:

adding means having first and second input ports, for receiving through said first input port data representing a difference between a predetermined crisp input data and center data of a membership function and receiving through said second input port a predetermined first selection signal for determining said membership function, and outputting address data by adding said data received at said first and second input ports;

memory means having pre-stored attachment degree data relating to said membership function for receiving said address data output from said adding means and outputting attachment degree data corresponding to said received address data;

selecting means for receiving said attachment degree data and selectively outputting a portion of said attachment degree data based on predetermined second and third selection signals, wherein said second and third selection signals correspond to said membership function; and logic means having two input ports, for receiving through one of said input ports a logic value corresponding to a comparison between a predetermined value and a difference between said predetermined crisp input data and said center data and receiving through the other of said input ports the data output from said selecting means, and outputting a final attachment degree data by logically combining the data input to said two input ports.

2. The fuzzy logic apparatus claimed in claim 1, wherein said attachment degree data output from said memory means is comprised of 20 bits of data and said portion of said attachment degree data is comprised of 5 bits of said attachment degree data.

3. The fuzzy logic apparatus claimed in claim 1, wherein said logic means is an AND logic gate for performing a logical AND operation on the data input to said two input ports.

4. The fuzzy logic apparatus claimed in claim 1, wherein said predetermined value is equal to the value of the maximum value of said membership function.

5. The fuzzy logic apparatus claimed in claim 4, wherein said predetermined value is 31.

6. The fuzzy logic apparatus claimed in claim 1, wherein said logic means outputs said attachment data input to said other of said input ports when an absolute value of said difference between said predetermined crisp input data and said center data is less than said predetermined value.

7. The fuzzy logic apparatus claimed in claim 1, wherein said memory has attachment data for a plurality of membership functions stored in the same memory location.

8. The fuzzy logic apparatus claimed in claim 1, wherein said membership function has a range of values which is twice as large as the maximum value of the attachment data of said membership function.

9. A fuzzy logic apparatus comprising:

an adder having first and second input ports, receiving through said first input port data representing a difference signal between a predetermined crisp input data and center data of a membership function and receiving through said second input port a predetermined first selection signal for determining said membership function, said adder outputting address data by adding said data received at said first and second input ports;

a memory having pre-stored attachment degree data relating to said membership function, said memory outputting attachment degree data corresponding in response to said address data output from said adder;

a multiplexer receiving said attachment degree data and second and third selection signals, said multiplexer selectively outputting a portion of said attachment degree data based on said predetermined second and third selection signals, wherein said second and third selection signals correspond to said membership function; and a logic unit having two input ports, receiving through one of said input ports a logic signal corresponding to a comparison between a predetermined value and a difference between said predetermined crisp input data and said center data and receiving through the other of said input ports the data output from said multiplexer, and outputting a final attachment degree data by logically combining the data input to said two input ports.

10. The fuzzy logic apparatus claimed in claim 9, wherein said attachment degree data output from said memory is comprised of 20 bits of data and said portion of said attachment degree data is comprised of 5 bits of said attachment degree data.

11. The fuzzy logic apparatus claimed in claim 9, wherein said logic unit is an AND gate for performing a logical AND operation on the data input to said two input ports.

12. The fuzzy logic apparatus claimed in claim 9, wherein said predetermined value is equal to the value of the maximum value of said membership function.

13. The fuzzy logic apparatus claimed in claim 12, wherein said predetermined value is 31.

14. The fuzzy logic apparatus claimed in claim 9, wherein said logic unit outputs said attachment data input to said other of said input ports when an absolute value of said difference between said predetermined crisp input data and said center data is less than said predetermined value.

15. The fuzzy logic apparatus claimed in claim 9, wherein said memory has attachment data for a plurality of membership functions stored in the same memory location.

16. The fuzzy logic apparatus claimed in claim 9, wherein said membership function has a range of values which is twice as large as the maximum value of the attachment data of said membership function.

* * * * *